(12) United States Patent
Hollingshurst

(10) Patent No.: US 8,460,404 B2
(45) Date of Patent: Jun. 11, 2013

(54) QUATERNARY SALTS FOR USE AS SURFACTANTS IN DISPERSIONS

(75) Inventor: Claire L. Hollingshurst, Heanor (GB)

(73) Assignee: The Lubrizol Corporation, Wickliffe, OH (US)

(*) Notice: Subject to any disclaimer, the term of this patent is extended or adjusted under 35 U.S.C. 154(b) by 269 days.

(21) Appl. No.: 12/936,419

(22) PCT Filed: May 11, 2009

(86) PCT No.: PCT/US2009/043432
§ 371 (c)(1),
(2), (4) Date: Nov. 8, 2010

(87) PCT Pub. No.: WO2009/140190
PCT Pub. Date: Nov. 19, 2009

(65) Prior Publication Data
US 2011/0048354 A1    Mar. 3, 2011

Related U.S. Application Data

(60) Provisional application No. 61/053,246, filed on May 15, 2008.

(51) Int. Cl.
*C10L 1/12* (2006.01)
*C10L 1/22* (2006.01)

(52) U.S. Cl.
USPC .............................. 44/422; 44/457

(58) Field of Classification Search
USPC ................................................. 44/422, 457
See application file for complete search history.

(56) References Cited

U.S. PATENT DOCUMENTS

| 4,171,959 | A | * | 10/1979 | Vartanian ................... 44/334 |
| 4,338,206 | A | * | 7/1982 | Hammond et al. ........... 508/266 |
| 4,412,288 | A | * | 10/1983 | Herman ...................... 600/342 |
| 2008/0052985 | A1 | | 3/2008 | Stevenson et al. |

FOREIGN PATENT DOCUMENTS

| GB | 761378 | 11/1956 |
| WO | 2004/026996 | 4/2004 |
| WO | 2005/097952 | 10/2005 |
| WO | 2006/135881 | 12/2006 |
| WO | 2006/138269 | 12/2006 |
| WO | 2008/027881 | 3/2008 |

OTHER PUBLICATIONS

Written Opinion of corresponding PCT Application No. PCT/US2009/043432 completed Jul. 24, 2009.

* cited by examiner

*Primary Examiner* — Cephia D Toomer
(74) *Attorney, Agent, or Firm* — Christopher P. Demas; Christopher D. Hilker

(57) ABSTRACT

The invention provides a composition comprising a dispersion comprising (a) an inorganic metal compound, (b) a quaternary salt surfactant and (c) an organic medium, wherein the metal compounds are uniformly dispersed in the organic medium. The invention also provides fuel compositions comprising said dispersion and methods of operating internal combustion engines and open flame burners utilizing said dispersion.

13 Claims, No Drawings

QUATERNARY SALTS FOR USE AS SURFACTANTS IN DISPERSIONS

FIELD OF INVENTION

The present invention relates to quaternary salt containing dispersions and fuel compositions that include such dispersions, where the dispersions work to improve performance of engines, burners and other fuel utilizing systems, by working to control deposits, improve combustion and controlling by-products or pollution from fuel combustion.

BACKGROUND OF THE INVENTION

In recent years attempts have been made to reduce the amount of pollutants/emissions released from combustion of fuels. Examples of pollutants include sulphur oxides (e.g. sulphur trioxide), nitrogen oxides, carbon monoxide, carbon dioxide and particulate matter. These pollutants are known to adversely affect levels of green-house gases or contribute to other problems, such as, smog. In the case of particulate matter, studies have also indicated adverse effects on human, animal and plant well being. Other by-products of fuel combustion include vanadate deposits. Vanadate deposits are believed to form corrosive low-melting slag that forms deposits. It would be desirable to combust fuels whilst keeping pollutants and deposits such as those mentioned above to a minimum.

International Publication WO 2005/097952 discloses providing a fuel composition containing a metal base with a solids content of greater than about 35 wt % of the dispersion. The composition disclosed employs one metal base per dispersion.

International Publication WO 04/026996 discloses a fuel additive composition capable of reducing vanadate deposits. The composition contains a metal inorganic oxygen containing compound, a liquid soluble in oil and a dispersant including fatty acid or ester derivatives thereof.

Some of the problems encountered in using dispersions in fuel-related applications relates to their material handling properties, and particularly their ability to be pumped as well as their ability to be remain homogenous, keeping the metals entrained in the dispersion in the mixture and preventing them from dropping out or becoming very viscous and difficult to handle. These handling and pumping issues can be generally related to a dispersions viscosity and particle size distribution, which are also interconnected. The higher the viscosity and the larger the particle size distribution of the dispersion, the worse the handling properties and the harder the dispersion and dispersion-containing fuel compositions are to store, use and pump, and so the less effective the dispersion. These problems not only make the dispersions and the fuels they go into more difficult to pump and handle but also less effective in providing the benefits and improvements to engine and burner operation.

There is a continued need for dispersions for use in fuel related applications, and more particularly there is a need for dispersions that have improved handling properties. The present invention provides dispersions that have improved handling characteristics as well as methods for providing and using such dispersions.

SUMMARY OF THE INVENTION

The present invention provides a composition comprising: (a) an inorganic metal compound; (b) a quaternary salt surfactant; and (c) an organic medium in which the particles of (a) are uniformly dispersed by physical processes, with (b), forming a dispersion. In one embodiment (a) has a mean average particle size of at least 10 nanometers to no more than 15 micrometers; and the dispersion composition has a solids content of greater than 15 wt %.

The present invention also provides for a fuel composition comprising: (i) a fuel; and (ii) a dispersion, wherein the dispersion comprises: (a) an inorganic metal compound; (b) a quaternary salt surfactant; and (c) an organic medium in which the metal compound is uniformly dispersed by physical processes. In one embodiment the metal compound has a mean average particle size of at least 10 nanometres to no more than 15 micrometers; and the dispersion has a solids content of greater than 15 wt %.

The present invention further provides a method of operating an internal combustion engine comprising supplying to the engine the compositions described herein, and also provides a method of operating an open flame burner comprising supplying to the burner the fuel compositions described herein.

DETAILED DESCRIPTION OF THE INVENTION

The present invention provides a composition that improves deposit control and combustion as well as methods of operating internal combustion engines and open flam burners that use the described compositions.

As used herein the term "free of" for all chemistry disclosed herein except for the metal compound, as used in the specification and claims, defines the absence of a material except for the amount which is present as impurities, e.g., a trace amount or a non-effective amount. Typically in this embodiment, the amount present will be less than about 0.05 wt % or less than about 0.005 wt % of the dispersion.

As a person skilled in the art will appreciate, impurities in the metal compound are typically about 1 wt % to about 3 wt % of the metal base. The reason for the impurities being typically about 1 wt % to about 3 wt % of the metal compound is believed to be due to mining processes. Typically the major impurities in the metal compound include calcium carbonates, silica or silicates.

In different embodiments the dispersion may be opaque or semi-translucent or translucent or transparent, or any gradation between such descriptions.

The Fuel

In one embodiment the present invention is a fuel composition which comprises a fuel and the dispersion. In other embodiments the invention is a dispersion used with a fuel. The fuel may comprise a liquid fuel, a biofuel, a solid fuel, or mixtures thereof. In one embodiment the fuel is a solid fuel. In another embodiment the fuel is a liquid fuel. Examples of a suitable solid fuel include coal.

When the fuel comprises a liquid fuel, the liquid fuel may also be utilized as a suitable organic medium for preparing the dispersion. Therefore to avoid duplication of the description, a more detailed description of the liquid fuel is disclosed below in the organic medium section.

The Inorganic Metal Compound

The inorganic metal compound of the invention comprises one or more metal bases containing divalent metals, trivalent metals, tetravalent metals, or a mixture of one or more thereof. In some embodiments the inorganic metal compound is a basic metal compound.

In one embodiment the inorganic metal compound may further comprise a monovalent metal base. In one embodiment the metal compound is derived from a monovalent metal including lithium, potassium, sodium, copper, or mixtures thereof. In one embodiment the metal oxidation state of the metal compound is other than (+1). In one embodiment the metal compound comprises a monovalent metal, a divalent metal, or a mixture thereof.

In another embodiment the average oxidation state of the metal compound ranges from about (+2) to about (+4), or from about (+2) to about (+3). Typically the metal of the metal compound is a divalent or trivalent metal. In one embodiment the metal compound is derived from a divalent metal including magnesium, calcium, barium or mixtures thereof. The metal may also have multiple valences, e.g., mono- or di- or tri-valent with cerium, copper, zinc, or iron as examples. In one embodiment the metal compound is derived from a tetravalent metal including cerium.

In one embodiment the metal of the metal compound comprises calcium and/or magnesium. In another embodiment the metal comprises calcium. In yet another embodiment the metal of the metal compounds consists essentially of calcium. In another embodiment the metal comprises magnesium. In yet another embodiment the metal of the metal compounds consists essentially of magnesium.

In some embodiments the metal compound is basic, where the basic metal compound may comprise oxides, carbonates, bicarbonates, hydroxides, sulphonates, carboxylates (e.g. $C_{1-30}$ or $C_{8-24}$ linear or branched alkyl carboxylates), or mixtures thereof. Optionally the metal compound further comprises water of crystallization or adsorbed (or absorbed) water. In one embodiment the metal base is crystalline.

In different embodiments the metal compound may comprise a sodium carbonate, sodium bicarbonate, sodium hydroxide, potassium carbonate, potassium bicarbonate, potassium hydroxide, lithium carbonate, lithium oxide, anhydrous lithium hydroxide, lithium hydroxide monohydrate, magnesium carbonate, magnesium oxide, magnesium hydroxide, calcium carbonate, calcium oxide, calcium hydroxide, copper acetate, or a mixture of two or more thereof.

In different embodiments a second metal compound is present, which comprises cerium oxide (CeO or $CeO_2$), cerium sulphonate, iron oxide ($Fe_2O_3$, FeO or $Fe_3O_4$), iron carboxylates (e.g. an octadecanoic acid salt with iron), copper oxide (CuO) or chromium oxides.

In one embodiment the metal compound is substantially free of metal bases other than one, two or three bases selected from the group consisting of magnesium hydroxide, calcium hydroxide, calcium carbonate, magnesium carbonate, calcium oxide, magnesium oxide, cerium oxide (CeO or $CeO_2$), iron oxide ($Fe_2O_3$, FeO or $Fe_3O_4$), copper oxide (CuO) or chromium oxides, and mixtures thereof.

In one embodiment a first metal compound contains a metal selected from the group consisting of magnesium, calcium and mixtures thereof; and a second metal compound contains a metal selected from the group consisting of cerium, iron, copper, chromium, and mixtures thereof.

In one embodiment the first metal compound is present in a weight greater than the second metal compound. The weight of the first metal compound present may be greater than about 50 wt %, or greater than about 75 wt %, or greater than about 95 wt % of the total amount of metal compound present. The weight of the second metal compound present may be less than about 50 wt %, or less than about 25 wt %, or less than about 5 wt % of the total amount of metal compound present.

The amount of metal compound present in the dispersion, that is, the solids content of the dispersion, is greater than about 15 wt % and may range from about 15 wt % to about 90 wt %, or from about 25 wt % to about 80 wt %, or from about 35 wt % to about 70 wt %, or from about 40 wt % to about 65 wt % of the dispersion. This amount is determined on the basis of the original dispersion and does not include any additional diluent into which the dispersion may be subsequently admixed to form, for instance, a fully formulated lubricating composition, nor does it include solids or non-volatile components from other sources. These percentage values represent the inorganic metal compound present in the composition, not just the metal content.

In one embodiment the metal compound is present at about 30 to about 80 wt % of the composition. In additional embodiments the metal base is present at about 40 to about 60 wt % or about 45 to about 55 wt % of the composition. In yet additional embodiments the metal base is present from about 19 to about 80 wt %, or about 20 to about 79 wt %, or about 20 to about 60 wt % of the dispersion.

In another embodiment the metal base is present in the dispersion in an amount such that the dispersion has a total base number, when possible, of 200 to 2300, 250 to 2200, 300 to 2000, or 400 to 1500. In other embodiments the metal base is present such that the dispersion has a total base number of 200 to 1500, 300 to 1000, 400 to 800, or 300 to 700.

The term "TBN" may be used herein to refer to total base number. The total base number is the amount of acid (perchloric or hydrochloric) needed to neutralize all or part of a material's basicity, expressed as milligrams of KOH per gram of sample. The total base number or TBN contributed to a functional fluid by a detergent pursuant to the disclosed technology may or may not represent the TBN for the entire functional fluid since other ingredients may also contribute basicity (or TBN) to the functional fluid.

The metal compound is typically in the form of a solid and is not appreciably soluble in the organic medium. In different embodiments the metal compound has a mean particle size in the dispersion ranging from about 10 nanometers to about 15 micrometers, or about 20 nanometers to about 10 micrometers. In additional embodiments the particle size of the solids are about 20 nanometers to less than about 1 micrometers, or about 30 nanometers to about 0.7 micrometers, or about 50 nanometers to about 0.4 micrometers, or about 80 nanometers to about 0.3 micrometers. In yet additional embodiments the metal compound is present in the dispersion as particles that are over 80 vol % less than 1 micron in diameter, or over 90 vol % less than 1 micron in diameter, or 100 vol % less than 1 micron in diameter. In still more embodiments, the metal base is present in the dispersion as particles that have a mean average diameter of from about 0.1 to about 1 microns, or from about 0.15 to about 0.5 microns, or no more than 0.3 microns.

In one embodiment the solids of the dispersion are very fine and have a mean average particle size of about 10 to about 500 nanometers, or about 50 to 400 nanometers, or about 100 to about 250 nanometers. In another embodiment the solids of the dispersion are coarser and have a mean average particle size of about 1 to about 15 micrometers, or about 1 to about 10 micrometers, or about 5 to about 10 micrometers. In yet another embodiment, the solids of the dispersion are made up of a mixture of solids with the finer particle size and solids with the coarser particle size.

In one embodiment the dispersion further comprises a co-ordination compound, such as, ferrocene (cyclopentadienyl based), carboxylates or sulphonates which are included with the metal base.

The Quaternary Salt Surfactant

The quaternary salt surfactant of the invention acts to stabilize the dispersion of the metal base in the organic medium. In one embodiment, the quaternary salt surfactant comprises the reaction product of: (i) at least one compound selected from the group consisting of: (a) the condensation product of a hydrocarbyl-substituted acylating agent and a compound having an oxygen or nitrogen atom capable of condensing with said acylating agent and said condensation product further having a tertiary amino group; (b) a polyalkene-substituted amine having at least one tertiary amino group; and (c) a Mannich reaction product having a tertiary amino group, said Mannich reaction product being prepared from the reaction of a hydrocarbyl-substituted phenol, an aldehyde, and an amine; and (ii) a quaternizing agent suitable for converting the tertiary amino group of compound (i) to a quaternary nitrogen, wherein the quaternizing agent is selected from the group consisting of dialkyl sulfates, benzyl halides, hydrocarbyl substituted carbonates; hydrocarbyl epoxides in combination with an acid or mixtures thereof.

In one embodiment the quaternary salt surfactant comprises the reaction product of (i) at least one compound selected from the group consisting of: a polyalkene-substituted amine having at least one tertiary amino group and/or a Mannich reaction product having a tertiary amino group; and (ii) a quaternizing agent.

Examples of quaternary ammonium salt and methods for preparing the same are described in the following patents, which are hereby incorporated by reference, U.S. Pat. No. 4,253,980, U.S. Pat. No. 3,778,371, U.S. Pat. No. 4,171,959, U.S. Pat. No. 4,326,973, U.S. Pat. No. 4,338,206, and U.S. Pat. No. 5,254,138.

The Hydrocarbyl-Substituted Acylating Agent and the Compound Having an Oxygen or Nitrogen Atom The hydrocarbyl substituted acylating agent of the invention is the reaction product of a long chain hydrocarbon, generally a polyolefin substituted with a monounsaturated carboxylic acid reactant such as (i) α,β-monounsaturated $C_4$ to $C_{10}$ dicarboxylic acid such as fumaric acid, itaconic acid, maleic acid.; (ii) derivatives of (i) such as anhydrides or $C_1$ to $C_5$ alcohol derived mono- or di-esters of (i); (iii) α,β-monounsaturated $C_3$ to $C_{10}$ monocarboxylic acid such as acrylic acid and methacrylic acid.; or (iv) derivatives of (iii) such as $C_1$ to $C_5$ alcohol derived esters of (iii) with any compound containing an olefinic bond represented by the general formula:

$$(R^1)(R^1)C = C(R^1)(CH(R^1)(R^1))$$ (I)

wherein each R1 is independently hydrogen or a hydrocarbyl group.

Olefin polymers for reaction with the monounsaturated carboxylic acids can include polymers comprising a major molar amount of $C_2$ to $C_{20}$, e.g. $C_2$ to $C_5$ monoolefin. Such olefins include ethylene, propylene, butylene, isobutylene, pentene, octene-1, or styrene. The polymers can be homopolymers such as polyisobutylene, as well as copolymers of two or more of such olefins such as copolymers of: ethylene and propylene; butylene and isobutylene; propylene and isobutylene. Other copolymers include those in which a minor molar amount of the copolymer monomers e.g., 1 to 10 mole % is a $C_4$ to $C_{18}$ diolefin, e.g., a copolymer of isobutylene and butadiene; or a copolymer of ethylene, propylene and 1,4-hexadiene.

In one embodiment, at least one R of formula (I) is derived from polybutene, that is, polymers of C4 olefins, including 1-butene, 2-butene and isobutylene. C4 polymers can include polyisobutylene. In another embodiment, at least one R of formula (I) is derived from ethylene-alpha olefin polymers, including ethylene-propylene-diene polymers. Ethylene-alpha olefin copolymers and ethylene-lower olefin-diene terpolymers are described in numerous patent documents, including European patent publication EP 0 279 863 and the following U.S. Pat. Nos. 3,598,738; 4,026,809; 4,032,700; 4,137,185; 4,156,061; 4,320,019; 4,357,250; 4,658,078; 4,668,834; 4,937,299; 5,324,800 each of which are incorporated herein by reference for relevant disclosures of these ethylene based polymers.

In another embodiment, the olefinic bonds of formula (I) are predominantly vinylidene groups, represented by the following formulas:

$$-(H)C = C(R^2)(R^2)$$ (II)

wherein $R^2$ is a hydrocarbyl group, and $$-(H)(R^3)C(C(CH_3) = CH2)$$ (III)

wherein $R^3$ is a hydrocarbyl group.

In one embodiment, the vinylidene content of formula (I) can comprise at least about 30 mole % vinylidene groups, at least about 50 mole % vinylidene groups, or at least about 70 mole % vinylidene groups. Such material and methods for preparing them are described in U.S. Pat. Nos. 5,071,919; 5,137,978; 5,137,980; 5,286,823; 5,408,018; 6,562,913; 6,683,138; 7,037,999 and U.S. Publication Nos. 20040176552A1, 20050137363 and 20060079652A1, which are expressly incorporated herein by reference, such products are commercially available by BASF, under the tradename GLISSOPAL® and by Texas Petrochemicals LP, under the tradename TPC 1105™ and TPC 595™.

Methods of making hydrocarbyl substituted acylating agents from the reaction of the monounsaturated carboxylic acid reactant and the compound of formula (I) are well know in the art and disclosed in the following patents: U.S. Pat. Nos. 3,361,673 and 3,401,118 to cause a thermal "ene" reaction to take place; U.S. Pat. Nos. 3,087,436; 3,172,892; 3,272,746; 3,215,707; 3,231,587; 3,912,764; 4,110,349; 4,234,435; 6,077,909; 6,165,235 and are hereby incorporated by reference.

In another embodiment, the hydrocarbyl substituted acylating agent can be made from the reaction of at least one carboxylic reactant represented by the following formulas:

$$(R^4C(O)(R^5)_nC(O))R^4 \text{ and}$$ (IV)

$$R^4-\underset{\underset{OH}{|}}{\overset{\overset{OR^4}{|}}{C}}-(R^5)_n-C(O)OR^4$$ (V)

wherein each $R^4$ is independently H or a hydrocarbyl group, and each $R^5$ is a divalent hydrocarbylene group and n is 0 or 1 with any compound containing an olefin bond as represented by formula (I). Compounds and the processes for making these compounds are disclosed in U.S. Pat. Nos. 5,739,356; 5,777,142; 5,786,490; 5,856,524; 6,020,500; and 6,114,547.

Compounds and the processes for making these compounds are disclosed in U.S. Pat. Nos. 3,954,808; 5,336,278; 5,458,793; 5,620,949; 5,827,805; and 6,001,781.

Other methods of making the hydrocarbyl substituted acylating agent can be found in the following reference, U.S. Pat. Nos. 5,912,213; 5,851,966; and 5,885,944 which are hereby incorporated by reference.

The compound having an oxygen or nitrogen atom capable of condensing with the acylating agent and further having a tertiary amino group can be represented by the following formulas:

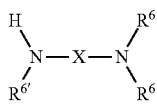

(VI)

wherein X is a alkylene group containing about 1 to about 4 carbon atoms; and wherein each $R^6$ is independently a hydrocarbyl group, and $R^{6'}$ can be hydrogen or a hydrocarbyl group.

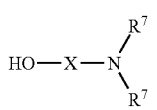

(VII)

wherein X is a alkylene group containing about 1 to about 4 carbon atoms; and wherein each $R^7$ is independently a hydrocarbyl group.

Examples of the nitrogen or oxygen contain compounds capable of condensing with the acylating agent and further having a tertiary amino group can include but are not limited to: ethylenediamine, 1,2-propylenediamine, 1,3-propylene diamine, the isomeric butylenediamines, pentanediamines, hexanediamines, heptanediamines, diethylenetriamine, dipropylenetriamine, dibutylenetriamine, triethylenetetraamine, tetraethylenepentaamine, pentaethylenehexaamine, hexamethylenetetramine, and bis(hexamethylene) triamine, the diaminobenzenes, the diaminopyridines or mixtures thereof. In addition, nitrogen or oxygen contain compounds which may be alkylated to contain a tertiary amino group may also used. Examples of the nitrogen or oxygen contain compounds capable of condensing with the acylating agent after being alkylated to having a tertiary amino group can include but are not limited to: dimethylaminopropylamine, N,N-dimethyl-aminopropylamine, N,N-diethyl-aminopropylamine, N,N-dimethyl-aminoethylamine or mixtures thereof. The nitrogen or oxygen containing compounds capable of condensing with the acylating agent and further having a tertiary amino group can further include aminoalkyl substituted heterocyclic compounds such as 1-(3-aminopropyl)imidazole and 4-(3-aminopropyl)morpholine, 1-(2-aminoethyl)piperidine, 3,3-diamino-N-methyldipropylamine, 3'3-aminobis(N, N-dimethylpropylamine). Another type of nitrogen or oxygen containing compounds capable of condensing with the acylating agent and having a tertiary amino group include alkanolamines including but not limited to triethanolamine, N,N-dimethylaminopropanol, N,N-diethylaminopropanol, N,N-diethylaminobutanol, N,N,N-tris(hydroxyethyl)amine, or mixtures thereof.

The Polyalkene-Substituted Amine

The polyalkene-substituted amines having at least one tertiary amino group of the present invention may be derived from an olefin polymer and an amine, such as, ammonia, monoamines, polyamines or mixtures thereof. They may be prepared by a variety of methods such as those described hereinafter.

One method of preparation of a polyalkene-substituted amine involves reacting a halogenated olefin polymer with an amine, as disclosed in U.S. Pat. Nos. 3,275,554; 3,438,757; 3,454,555; 3,565,804; 3,755,433; and 3,822,289.

Another method of preparation of a polyalkene-substituted amine involves reaction of a hydroformylated olefin with a polyamine and hydrogenating the reaction product, as disclosed in U.S. Pat. Nos. 5,567,845 and 5,496,383.

Another method of preparation of a polyalkene-substituted amine involves converting a polyalkene by means of a conventional epoxidation reagent with or without a catalyst, into the corresponding epoxide and converting the epoxide into the polyalkene substituted amine by reaction with ammonia or an amine under the conditions of reductive amination, as disclosed in U.S. Pat. No. 5,350,429.

Another method for preparing polyalkene-substituted amine involves hydrogenation of a β-aminonitrile, which is made by reacting an amine with a nitrile, as disclosed in U.S. Pat. No. 5,492,641.

Yet another method for preparing polyalkene-substituted amine involves hydroformylating an polybutene or polyisobutylene with a catalyst, such as, rhodium or cobalt, in the presence of CO and H2 at elevated pressures and temperatures, as disclosed in U.S. Pat. No. 4,832,702.

The above methods for the preparation of polyalkene substituted amine are for illustrative purposes only and are not meant to be an exhaustive list. The polyalkene-substituted amines of the present invention are not limited in scope to the methods of their preparation disclosed hereinabove.

In one embodiment, the olefin polymers used to make the polyalkene-substituted amine of the present invention are derived from olefin polymers. Suitable olefin polymers for preparing the polyalkene-substituted amines of the invention are the same as those described above.

In one embodiment, the amines that can be used to make the polyalkene-substituted amine include ammonia, monoamines, polyamines, or mixtures thereof, including mixtures of different monoamines, mixtures of different polyamines, and mixtures of monomamines and polyamines (which include diamines). The amines include aliphatic, aromatic, heterocyclic and carbocyclic amines.

In one embodiment, the amines of the present invention may be characterized by the formula: $R^4R^5NH$ wherein $R^4$ and $R^5$ are each independently hydrogen, hydrocarbon, amino-substituted hydrocarbon, hydroxy-substituted hydrocarbon, alkoxy-substituted hydrocarbon, or acylimidoyl groups provided that no more than one of $R^4$ and $R^5$ is hydrogen. In all cases, therefore, they will be characterized by the presence within their structure of at least one H—N≦group. Therefore, they have at least one primary (i.e., $H_2N$—) or secondary amino (i.e., H—N<) group. Examples of monoamines include ethylamine, dimethylamine, diethylamine, n-butylamine, dibutylamine, allylamine, isobutylamine, cocoamine, stearylamine, laurylamine, methyllaurylamine, oleylamine, N-methyl-octylamine, dodecylamine, diethanolamine, morpholine, and octadecylamine.

The polyamines from which the detergent is derived include principally alkylene amines conforming, for the most part, to the formula

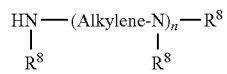

(VIII)

wherein n is an integer typically less than 10, each $R^8$ is independently hydrogen or a hydrocarbyl group typically having up to 30 carbon atoms, and the alkylene group is typically an alkylene group having less than 8 carbon atoms. The alkylene amines include principally, ethylene amines, hexylene amines, heptylene amines, octylene amines, other polymethylene amines. They are exemplified specifically by:

ethylenediamine, diethylenetriamine, triethylene tetramine, propylene diamine, decamethylene diamine, octamethylene diamine, di(heptamethylene) triamine, tripropylene tetramine, tetraethylene pentamine, trimethylene diamine, pentaethylene hexamine, di(-trimethylene) triamine, aminopropylmorpholine and dimethylaminopropylamine. Higher homologues such as are obtained by condensing two or more of the above-illustrated alkylene amines likewise are useful. Tetraethylene pentamine is particularly useful.

The ethylene amines, also referred to as polyethylene polyamines, are especially useful. They are described in some detail under the heading "Ethylene Amines" in Encyclopedia of Chemical Technology, Kirk and Othmer, Vol. 5, pp. 898-905, Interscience Publishers, New York (1950).

Any of the above polyalkene-substituted amines, which are secondary or primary amines, may be alkylated to tertiary amines using alkylating agents, also described herein below as quaternizing agents, such as, dialkyl sulfates; alkyl halides; hydrocarbyl substituted carbonates; hydrocarbyl epoxides in combination with an acid and mixtures thereof. When using certain quaternizing agents, such as, alkyl halides or dialkyl sulfates, it may be necessary to provide of a base or basic agent like sodium carbonate or sodium hydroxide to free the amine from its protonated salt after alkylation to give the free tertiary amine. Primary amines require two equivalents of alkylating agent and two equivalents of base to get to a tertiary amine. In one embodiment, the alkylation of a primary amine may often be done in four successive steps, first a treatment with the alkylating agent and then second treatment with a base and then repeating both steps. In another embodiment, it the alkylation of a primary amine can be done in one step, for example, using two moles of alkyl halide in the presences of an excess of heterogeneous base, such as, sodium carbonate. Exhaustive alkylation of a polyamine can be done in a similar manner using an amount of alkylating agent equal to or in excess of the equivalents of hydrogens on the nitrogens of the amine and an excess of base. In one embodiment, the polyamine is partially alkylated to a tertiary amine prior to quaternization.

In another embodiment, alkylating primary amines and secondary amines to tertiary amines may also be accomplished using epoxides. Unlike with the alkyl halides, when using an epoxide, no treatment with base is required to get to the free amine. Typically, when alkylating amines using epoxides, one would use at least one mole of epoxide for each hydrogen atom on the amine (e.g., a simple primary amine, such as, R—NH2, would require two moles of epoxide.) In alkylating to the tertiary amine with an epoxide, neither additional acid nor base is required.

The Mannich Reaction Product

The Mannich reaction product of the invention has a tertiary amino group and is prepared from the reaction product of a hydrocarbyl-substituted phenol, an aldehyde, and an amine.

The hydrocarbyl substituent of the hydrocarbyl-substituted phenol can have 10 to 400 carbon atoms, in another instance 30 to 180 carbon atoms, and in a further instance 10 or 40 to 110 carbon atoms. This hydrocarbyl substituent can be derived from an olefin or a polyolefin. Useful olefins include alpha-olefins, such as 1-decene, which are commercially available. Polyolefins suitable for preparing Mannich reaction product of the invention are the same as those are described above. The hydrocarbyl-substituted phenol can be prepared by alkylating phenol with an olefin or polyolefin described above, such as, a polyisobutylene or polypropylene, using well-known alkylation methods.

The aldehyde used to form the Mannich detergent can have 1 to 10 carbon atoms, and is generally formaldehyde or a reactive equivalent thereof such as formalin or paraformaldehyde.

The amine used to form the Mannich detergent can be a monoamine or a polyamine. Amines suitable for preparing the Mannich reaction product of the invention are the same as those are described above.

In one embodiment, the Mannich detergent can be prepared by reacting a hydrocarbyl-substituted phenol, an aldehyde, and an amine as described in U.S. Pat. No. 5,697,988. In one embodiment, the Mannich reaction product can be prepared from an alkylphenol derived from a polyisobutylene, formaldehyde, and an amine that is a primary monoamine, a secondary monoamine, or an alkylenediamine, in particular, ethylenediamine or dimethylamine.

In another embodiment, the Mannich reaction product of the present invention can be prepared by reacting the alkyl-substituted hydroxyaromatic compound, aldehyde and polyamine by well known methods including the method described in U.S. Pat. No. 5,876,468.

In yet another embodiment, the Mannich reaction product can be prepared by well known methods generally involving reacting the hydrocarbyl substituted hydroxy aromatic compound, an aldehyde and an amine at temperatures between 50 to 200° C. in the presence of a solvent or diluent while removing reaction water as described in U.S. Pat. No. 5,876,468.

It may be necessary with some of the amines to further react the Mannich reaction product with an epoxide or carbonate or other alkylating agents to get the tertiary amino group.

The Quaternizing Agent

The composition of the present invention contains a quaternizing agent suitable for converting the tertiary amino group to a quaternary nitrogen wherein the quaternizing agent is selected from the group consisting of dialkyl sulfates, alkyl halides, hydrocarbyl substituted carbonates; hydrocarbyl epoxides in combination with an acid and mixtures thereof. In one embodiment, where the invention includes a polyalkene-substituted amine that contains solely primary or secondary amino groups, it is necessary to alkylate at least one of the primary or secondary amino groups to a tertiary amino group as described above.

In one embodiment the quaternizing agent can include halides, such as chloride, iodide or bromide; hydroxides; sulphonates; alkyl sulphates, such as dimethyl sulphate; sultones; phosphates; C1-12 alkylphosphates; di C1-12 alkylphosphates; borates; C1-12 alkylborates; nitrites; nitrates; carbonates; bicarbonates; alkanoates; O,O-di-C1-12 alkyldithiophosphates; or mixtures thereof.

In one embodiment, alkylation of primary amines and secondary amines or mixtures with tertiary amines may be exhaustively or partially alkylated to a tertiary amine and further alkylated to a quaternary salt all in one step. In this one step, it is necessary to properly account for the hydrogens on the nitrogens and provide base or acid as required (e.g., alkylation up to the tertiary amine requires removal (neutralization) of the hydrogen (proton) from the product of the alkylation). With alkylating agents, such as, alkyl halides or dialkyl sulfates, the product of alkylation of a primary or secondary amine is a protonated salt and needs a source of base to free the amine and to proceed to the quaternary salt with these such agents requires alkylation of the tertiary amine, and the product is the quaternary ammonium halide or monomethyl sulfate. In contrast, epoxides as alkylating agents do both the alkylation and the neutralization such that the intermediate alkylation product is already the free amine. To proceed to the quaternary salt with epoxides it is necessary to provide an equivalent of an acid to provide a proton for the hydroxy group and a counter anion for the salt.

In one embodiment the quaternizing agent may be derived from dialkyl sulphates such as dimethyl sulphate, N-oxides, sultones such as propane and butane sultone; alkyl, acyl or araalkyl halides such as methyl and ethyl chloride, bromide or iodide or benzyl chloride, and a hydrocarbyl (or alkyl) substituted carbonates. If the acyl halide is benzyl chloride, the aromatic ring is optionally further substituted with alkyl or alkenyl groups.

The hydrocarbyl (or alkyl) groups of the hydrocarbyl substituted carbonates may contain 1 to 50, 1 to 20, 1 to 10 or 1 to 5 carbon atoms per group. In one embodiment the hydrocarbyl substituted carbonates contain two hydrocarbyl groups that may be the same or different. Examples of suitable hydrocarbyl substituted carbonates include dimethyl or diethyl carbonate.

In another embodiment the quaternizing agent can be a hydrocarbyl epoxides, as represented by the following formula, in combination with an acid:

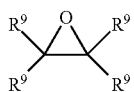

(IX)

wherein each $R^9$ is independently H or a C1-50 hydrocarbyl group. Examples of hydrocarbyl epoxides can include, styrene oxide, ethylene oxide, propylene oxide, butylene oxide, stilbene oxide and C2-50 epoxide.

The quaternary salt surfactant may be present in the composition from 0 to about 30 wt % of the dispersion, or 0 to about 20 wt % of the dispersion, or 0 to about 15 wt % of the dispersion. In some embodiments, the quaternary salt surfactant is present from about 1 to about 30 wt %, or about 2 to about 20 wt %, or about 3 to about 15 wt %, or about 5 to about 10 wt % of the dispersion.

The Optional Additional Surfactant

In some embodiments the invention may be free of any additional surfactants. However, in some embodiments the invention may further comprise one or more additional surfactants. The surfactant may include an ionic (cationic or anionic) or non-ionic compound. Generally, the surfactant acts to stabilize the dispersion of the metal base in the organic medium. In one embodiment the invention is substantially free of, to free of, a surfactant.

Suitable surfactant compounds include those with a hydrophilic lipophilic balance (HLB) ranging from about 1 to about 40, or about 1 to about 20, or about 1 to about 18, or about 2 to about 16, or about 2.5 to about 15. In different embodiments the HLB may be about 11 to about 14, or less than about 10 such as about 1 to about 8, or about 2.5 to about 6. Combinations of surfactants may be used with individual HLB values outside of these ranges, provided that the composition of a final surfactant blend is within these ranges. When the surfactant has an available acidic group, the surfactant may become the metal salt of the acidic group and where the metal is derived from the metal base.

Examples of surfactants suitable for the invention are disclosed in *McCutcheon's Emulsifiers and Detergents*, 1993, North American & International Edition. Generic examples include alkanolamides, alkylarylsulphonates, amine oxides, poly(oxyalkylene) compounds, including block copolymers comprising alkylene oxide repeat units (e.g., Pluronic™), carboxylated alcohol ethoxylates, ethoxylated alcohols, ethoxylated alkyl phenols, ethoxylated amines and amides, ethoxylated fatty acids, ethoxylated fatty esters and oils, fatty esters, glycerol esters, glycol esters, imidazoline derivatives, phenates, lecithin and derivatives, lignin and derivatives, monoglycerides and derivatives, olefin sulphonates, phosphate esters and derivatives, propoxylated and ethoxylated fatty acids or alcohols or alkyl phenols, sorbitan derivatives, sucrose esters and derivatives, sulphates or alcohols or ethoxylated alcohols or fatty esters, polyisobutylene succinicimide and derivatives.

In one embodiment the surfactant comprises polyesters as defined in column 2, line 44 to column 3, line 39 of U.S. Pat. No. 3,778,287. Examples of suitable polyester surfactants are prepared in U.S. Pat. No. 3,778,287 as disclosed in Polyester Examples A to F (including salts thereof).

In one embodiment the surfactant is a hydrocarbyl substituted aryl sulphonic acid (or sulphonate) of an alkali metal, alkaline earth metal or mixtures thereof. The aryl group of the aryl sulphonic acid may be phenyl or naphthyl. In one embodiment the hydrocarbyl substituted aryl sulphonic acid comprises alkyl substituted benzene sulphonic acid.

The hydrocarbyl (especially an alkyl) group typically contains about 8 to about 30, or about 10 to about 26, or about 10 to about 15 carbon atoms. In one embodiment the surfactant is a mixture of $C_{10}$ to $C_{15}$ alkylbenzene sulphonic acids. Examples of sulphonates include dodecyl and tridecyl benzene sulfonates or condensed naphthalenes or petroleum sulfonates, as well as sulphosuccinates and derivatives.

In one embodiment the surfactant is in the form of a neutral or overbased surfactant, typically salted with an alkali or alkaline earth metal. The alkali metal includes lithium, potassium or sodium; and the alkaline earth metal includes calcium or magnesium. In one embodiment the alkali metal is sodium. In one embodiment the alkaline earth metal is calcium.

In one embodiment the surfactant is a derivative of a polyolefin. Typical examples of a polyolefin include polyisobutene; polypropylene; polyethylene; a copolymer derived from isobutene and butadiene; a copolymer derived from isobutene and isoprene; or mixtures thereof.

Typically the derivative of a polyolefin comprises a polyolefin-substituted acylating agent optionally further reacted to form an ester and/or aminoester. The acylating agents and polyolefins suitable for use in the invention as additional surfactants are similar to those described above in the preparation of the quaternary salt surfactant, including polyisobutylene succinic anhydrides and derivatives thereof. Typical derivatives of polyisobutylene succinic anhydrides include hydrolysed succinic anhydrides, esters or diacids. Polyisobutylene succan derivatives are preferred to make the metal base dispersions. A large group of polyisobutylene succinic anhydride derivatives are taught in U.S. Pat. No. 4,708,753, and U.S. Pat. No. 4,234,435.

In another embodiment the surfactant comprises a salixarene (or salixarate if in the form of a metal salt). The salixarene is defined as an organic substrate of a salixarate. A detailed description of salixarene and salixarate chemistry is disclosed in EP 1 419 226 B1, including methods of preparation as defined in Examples 1 to 23 (page 11, line 42 to page 13, line 47).

In one embodiment the surfactant is substantially free of, to free of, a fatty acid or derivatives thereof, such as esters. In one embodiment the surfactant is other than a fatty acid or derivatives thereof.

In one embodiment the surfactant comprises at least of hydrocarbyl substituted aryl sulphonic acids, derivatives of polyolefins, polyesters or salixarenes (or salixarates).

In different embodiments the surfactant is substantially free of, to free of, phospholipids, (such as lecithin) and/or amino acids (such as sarcosines).

In one embodiment the surfactant has a molecular weight of less than 1000, in another embodiment less than about 950, for example, about 250, about 300, about 500, about 600, about 700, or about 800.

In one embodiment the optional additional surfactant comprises a hydrocarbyl substituted aryl sulphonic acid, a polyolefin-substituted acylating agent, a salixarene, or a mixture or two or more thereof. In one embodiment the polyolefin-substituted acylating agent is a polyisobutylene succinic anhydride.

The optional additional surfactant may be present in the composition from 0 to about 30 wt % of the dispersion, or 0 to about 20 wt % of the dispersion, or 0 to about 15 wt % of the dispersion. In some embodiments, the surfactant is present from about 1 to about 20 wt %, or about 3 to about 15 wt % of the dispersion.

When the optional surfactant is present, in one embodiment it is present in a weight ratio with the quaternary salt surfactant from 10:1 to 1:10. In additional embodiments the weight ratio of the quaternary salt surfactant to the optional surfactant is from 10:1 to 3:7, 10:1 to 3:4, 10:1 to 1:1. In another embodiment the optional surfactant is present at no more than a 1:1 weight ratio with the quaternary salt surfactant.

The Organic Medium

The organic medium may comprise an oil of lubricating viscosity, a liquid fuel, a hydrocarbon solvent or mixtures thereof. Typically the organic medium, or solvent, comprises an oil of lubricating viscosity, a liquid fuel, or a mixture thereof.

Optionally the organic medium contains water, typically up to about 1 wt %, or about 2 wt % or about 3 wt % of the dispersion. In different embodiments the organic medium is substantially free of, to free of, water.

The organic medium may be present in the composition from about 20 to about 80 wt % of the dispersion, or about 20 to about 50 wt % of the dispersion, or about 30 to about 40 wt % of the dispersion. In another embodiment the organic base is from about 10 to about 80 wt %, or 10 to about 60 wt %, or about 10 to about 50 wt %, or about 10 to about 59 wt %, or about 19 to about 60 wt % of the dispersion.

Oils of Lubricating Viscosity

In one embodiment the organic medium comprises an oil of lubricating viscosity. Such oils include natural and synthetic oils, oil derived from hydrocracking, hydrogenation, and hydrofinishing, unrefined, refined and re-refined oils and mixtures thereof. In another embodiment the dispersion comprises some amount of oil of lubricating viscosity separate from the organic medium.

Unrefined oils are those obtained directly from a natural or synthetic source generally without (or with little) further purification treatment.

Refined oils are similar to the unrefined oils except they have been further treated in one or more purification steps to improve one or more properties. Purification techniques are known in the art and include solvent extraction, secondary distillation, acid or base extraction, filtration, percolation and the like.

Re-refined oils are also known as reclaimed or reprocessed oils, and are obtained by processes similar to those used to obtain refined oils and often are additionally processed by techniques directed to removal of spent additives and oil breakdown products.

Natural oils useful in making the inventive lubricants include animal oils, vegetable oils (e.g., castor oil, lard oil), mineral lubricating oils such as liquid petroleum oils and solvent-treated or acid-treated mineral lubricating oils of the paraffinic, naphthenic or mixed paraffinic-naphthenic types and oils derived from coal or shale or mixtures thereof.

Synthetic lubricating oils are useful and include hydrocarbon oils, such as, polymeric tetrahydrofurans, polymerised and interpolymerised olefins (e.g., polybutylenes, polypropylenes, propyleneisobutylene copolymers); poly(1-hexenes), poly(1-octenes), poly(1-decenes), and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); alkylated diphenyl ethers and alkylated diphenyl sulphides and the derivatives, analogs and homologs thereof or mixtures thereof.

Other synthetic lubricating oils include. Synthetic oils may be produced by Fischer-Tropsch reactions and typically may be hydroisomerised Fischer-Tropsch hydrocarbons or waxes.

Oils of lubricating viscosity may also be defined as specified in the American Petroleum Institute (API) Base Oil Interchangeability Guidelines. The five base oil groups are as follows: Group I (sulphur content >0.03 wt %, and/or <90 wt % saturates, viscosity index 80-120); Group II (sulphur content $\leq$0.03 wt %, and $\geq$90 wt % saturates, viscosity index 80-120); Group III (sulphur content $\leq$0.03 wt %, and $\geq$90 wt % saturates, viscosity index $\geq$120); Group IV (all polyalphaolefins (PAOs)); and Group V (all others not included in Groups I, II, III, or IV). The oil of lubricating viscosity comprises an API Group I, Group II, Group III, Group IV, Group V oil and mixtures thereof. Often the oil of lubricating viscosity is an API Group I, Group II, Group III, Group IV oil and mixtures thereof. Alternatively the oil of lubricating viscosity is often an API Group I, Group II, Group III oil or mixtures thereof.

Liquid Fuel

In one embodiment the organic medium may comprise a liquid fuel. In another embodiment the dispersion my be present in a fuel composition where the fuel component is a liquid fuel.

The liquid fuels suitable for use with the invention are normally liquid at ambient conditions. Suitable liquid fuels include hydrocarbon fuel, biofuel (such as, bio-diesel), non-hydrocarbon fuel, water blended fuel, or mixtures thereof. The hydrocarbon fuel may be a petroleum distillate such as a gasoline as defined by ASTM (American Society for Testing and Materials) specification D4814 or a diesel fuel as defined by ASTM specification D975. In an embodiment the liquid fuel is a gasoline, and in another embodiment the liquid fuel is a leaded gasoline, or a nonleaded gasoline. In another embodiment the liquid fuel is a diesel fuel. The hydrocarbon fuel includes a hydrocarbon prepared by a gas to liquid process for example hydrocarbons prepared by a process such as the Fischer-Tropsch process. The nonhydrocarbon fuel includes an oxygen containing composition (often referred to as an oxygenate), an alcohol, an ether, a ketone, an ester of a carboxylic acid, a nitroalkane, or a mixture thereof. The nonhydrocarbon fuel includes methanol, ethanol, methyl t-butyl ether, methyl ethyl ketone, transesterified oils and/or fats from plants and animals such as rapeseed methyl ester and soybean methyl ester, and nitromethane. Mixtures of hydrocarbon and nonhydrocarbon fuels include gasoline and methanol and/or ethanol, diesel fuel and ethanol, and diesel fuel and a transesterified plant oil such as rapeseed methyl ester. In one embodiment the liquid fuel is a nonhydrocarbon fuel or a mixture thereof.

The dispersion may be used as a sole additive for a fuel composition. In one embodiment the dispersion is used as one additive in combination with other performance additives to provide a fuel composition. In one embodiment the invention provides a fuel composition comprising (i) a fuel and (ii) a dispersion comprising: (a) an inorganic metal compound; (b) a quaternary salt surfactant; and (c) an organic medium in which the metal base is dispersed. The dispersion may further comprise additional surfactants and the dispersion and/or the fuel composition may either further comprise an oil of lubricating viscosity (other than the organic medium) and/or other performance additives.

The fuel composition may thus comprise an oil of lubricating viscosity as defined above, in addition to the amount which may be present as the organic medium of the dispersion.

Other Performance Additives

The fuel composition optionally comprises other performance additives. The other performance additives comprise at least one of metal deactivators, detergents, dispersants, viscosity modifiers, friction modifiers, corrosion inhibitors, extreme pressure agents, anti-scuffing agents, antioxidants, foam inhibitors, demulsifiers, pour point depressants, seal swelling agents and mixtures thereof. Fully-formulated fuels may contain one or more of these performance additives.

Process for Dispersion Preparation

The dispersion may be prepared by physical processes, that is, by any one or more of various physical processes, i.e., physical processing steps. Examples of physical process include agitating, milling, grinding, crushing or mixtures thereof. Typically the process grinds the metal base to a mean average particle size of at least 10 nanometres to less than 15 micrometers, as discussed above. Milling processes include using a rotor stator mixer, a vertical bead mill, a horizontal bead mill, basket milling, ball mill, pearl milling or mixtures thereof. In one embodiment, the physical processes for preparing the dispersion comprise using a vertical or horizontal bead mill.

In one embodiment the invention further provides a process for preparing a dispersion comprising the steps of: (1) mixing: (a) at least one metal base; (b) a quaternary salt surfactant and (c) a organic medium, to form a slurry; and then (2) grinding the slurry of step (1) to form a dispersion. In one embodiment each metal of the metal bases has an average oxidation state of about (+2) or higher. In another embodiment the dispersion may contain additional surfactants and/or other performance additives.

In different embodiments the milling process may be carried out in a vertical or horizontal bead mill. Either bead mill processes cause the reduction of particle size of the metal compound by high energy collisions of the metal compound with at least one bead; and/or other metal base agglomerates, aggregates, solid particles; or mixtures thereof. The beads typically have a mean particle size and mass greater than the desired mean particle size of the metal base. In some instances the beads are a mixture of different mean particle size. The beads used in the grinding may be of materials known to those skilled in the art, such as metal ceramic, glass, stone, or composite materials.

The mill typically contains beads present at least about 40 vol %, or at least about 60 vol % of the mill. A range include for example about 60 vol % to about 95 vol %. A more detailed description of making the dispersion is disclosed in US Patent Application Number US05/010631.

Industrial Application

The method of controlling by-products or pollutants from fuel combustion dispersion is useful for numerous open or closed flame combustion systems. Suitable combustion systems include power stations, internal combustion engines, industrial and marine compression engines and turbines (commonly combusting a distillate, residual or heavy fuel oils).

In different embodiments a suitable dispersion is added to the fuel in ranges from about 1 ppm to about 10,000 ppm, or from about 20 ppm to about 7500 ppm, or from about 100 ppm to about 5000 ppm, or from about 200 ppm to about 3000 ppm.

In one embodiment, the invention provides a method of controlling by-products or pollutants from fuel combustion, comprising supplying thereto a fuel comprising the dispersion as described herein. The use of the dispersion in a fuel may impart a means of controlling by-products or pollutants from fuel combustion. Typically, the by-products or pollutants from fuel combustion comprise two or more properties from modified sulphur oxide emission, modified nitrogen oxide emission, modified particulate matter production, modified vanadate production or mixtures thereof. In one embodiment the fuel dispersion comprises a calcium base and the base is capable of modifying sulphur oxide emissions, and particulate matter production. In one embodiment the fuel dispersion comprises a magnesium base and the base is capable of modifying vanadate production, sulphur oxide emissions, and particulate matter production.

In one embodiment, the invention is a composition comprising the dispersion described above, an oil of lubricating viscosity, or other organic medium, and other performance additives. The dispersion may be present in the composition from about 0.1 to about 20 wt %, or from about 0.5 to about 10 wt %, or from 1 to about 10 wt %. The oil of lubricating viscosity, or other organic medium, may be present in the composition from about 50 to about 99.9 wt %, or from about 65 to about 99.5 wt %, or from about 75 to about 94 wt %. The other performance additives may be present in the composition from about 0 to about 30 wt %, or from about 0 to about 25 wt %, or from 5 to about 15 wt %.

In one embodiment, the invention provides for a method of operating an internal combustion engine comprising supplying to the engine a fuel composition comprising the dispersion described above. In another embodiment, the invention provides a method of operating either an open or closed flame burner comprising supplying to the burner a fuel comprising the dispersion described above.

The following examples provide an illustration of the invention. These examples are non-exhaustive and are not intended to limit the scope of the invention.

EXAMPLES

Comparative Example 1

A calcium hydroxide comparative sample is prepared with the following formula: 50 wt % industrial grade calcium hydroxide, 40 wt % 100N diluent oil, and 10 wt % surfactant where the surfactant is a commercially available 1000 Mn polyisobutylene succinimide derived from triethylenetetramine.

Comparative Example 2

A dispersion is prepared with the following formula: 50 wt % industrial grade magnesium oxide, 40 wt % 100N diluent oil, and 10 wt % surfactant where the surfactant is a commercially available 1000 Mn polyisobutylene succinimide derived from triethylenetetramine.

Comparative Example 3

A dispersion is prepared with the following formula: 50 wt % industrial grade magnesium oxide, 40 wt % 100N diluent oil, and 10 wt % surfactant where the surfactant is a non-quaternized succinic anhydride prepared from 1000 Mn polyisobutylene (77.9 pbw), 100 N diluent oil (13.7 pbw) and dimethylaminopropylamine (8.4 pbw).

Example 1

A dispersion is prepared with the following formula: 50 wt % industrial grade calcium hydroxide, 36 wt % 100N diluent oil, and 14 wt % quaternary salt surfactant. The quaternary salt surfactant is prepared from a succinic anhydride (93.6 pbw) and dimethylsulphate (6.4 pbw). The succinic anhydride used in the preparation of the quaternary salt surfactant is prepared from 1000 Mn polyisobutylene (77.9 pbw), 100 N diluent oil (13.7 pbw) and dimethylaminopropylamine (8.4 pbw).

Example 2

A dispersion is prepared with the following formula: 50 wt % industrial grade calcium hydroxide, 37 wt % 100N diluent oil, 10 wt % of a commercially available surfactant derived from 1000 Mn polyisobutylene succinimide and polyethylene polyamines, and 3 wt % quaternary salt surfactant, where the quaternary salt surfactant is prepared from a succinic anhydride (98.0 pbw) and propylene oxide (2.0 pbw). The succinic anhydride used in the preparation of the quaternary salt surfactant is the same succinic anhydride used in Example 1.

Example 3

A dispersion is prepared with the following formula: 50 wt % industrial grade magnesium oxide, 40 wt % 100N diluent oil, and 10 wt % quaternary salt surfactant. The quaternary salt surfactant is the same as that used in Example 1.

Example 4

A dispersion is prepared with the following formula: 50 wt % industrial grade magnesium oxide, 36 wt % 100N diluent oil, and 14 wt % quaternary salt surfactant. The quaternary salt surfactant is the same as that used in Example 1.

Example 5

A dispersion is prepared with the following formula: 50 wt % industrial grade magnesium oxide, 37 wt % 100N diluent oil, 10 wt % of a commercially available surfactant derived from 1000 Mn polyisobutylene succinimide and polyethylene polyamines, and 3 wt % quaternary salt surfactant of Example 2.

Example 6

A dispersion is prepared with the following formula: 50 wt % industrial grade magnesium oxide, 37 wt % 100N diluent oil, 6.5 wt % of a commercially available surfactant derived from 1000 Mn polyisobutylene succinimide and polyethylene polyamines, and 6.5 wt % quaternary salt surfactant of Example 2.

Each of the dispersion compositions described above is prepared by the same method: a slurry is prepared for each example according to the formulations below by mixing the components thoroughly using a high shear, saw-tooth stirrer for 30 minutes or until a smooth homogenous mixture was obtained. Each slurry is then pumped through a lab-scale ECM Dyno Mill MultiLab, which is a horizontal bead mill commercially available from W.A.B. A.G., Basel. Each slurry is pumped through the mill in four single passes with a cumulative residence time of approximately 15 minutes. For the passes, the mill is filled with 65% vol/vol of 0.3 mm diameter YtZ grinding media and fitted with three tungsten steel accelerators with a tip speed of 8 m/s. The coolant temperature of the mill is set to 10 degrees Celsius. These steps result in a dispersion composition. Where appropriate, the mean particle size of the dispersion particles is determined after cooling by a Coluter® LS230 Particle Size Analyzer. The dispersions prepared are pourable.

The tables below summarize the surfactants used in the examples as well as the residence time, particle size and viscosity data of the dispersion compositions. Table 1 shows the surfactants used in each example with the values given representing the weight percent of each surfactant present in the dispersion. An empty cell indicates that particular surfactant was not present in the dispersion.

TABLE 1

Summary of Surfactants in the Examples

| Example ID | Metal Present | Surfactant A[1] | Surfactant B[2] | Surfactant C[3] | Surfactant D[4] | Surfactant E[5] |
|---|---|---|---|---|---|---|
| Comp 1 | Ca | 10% wt | | | | |
| Comp 2 | Mg | 10% wt | | | | |
| Comp 3 | Mg | | 10% wt | | | |
| Ex 1 | Ca | | | | 10% wt | |
| Ex 2 | Ca | | | 10% wt | | 3% wt |
| Ex 3 | Mg | | | | 10% wt | |
| Ex 4 | Mg | | | | 14% wt | |
| Ex 5 | Mg | | | 10% wt | | 3% wt |
| Ex 6 | Mg | | | 6.5% wt | | 6.5% wt |

[1]Surfactant A is the commercially available 1000 Mn polyisobutylene succinimide derived from triethylenetetramine.
[2]Surfactant B is a non-quaternized succinic anhydride prepared from 1000 Mn polyisobutylene, 100 N diluent oil and dimethylaminopropylamine.
[3]Surfactant C is a non-quaternized, commercially available surfactant derived from 1000 Mn polyisobutylene succinimide and polyethylene polyamines.
[4]Surfactant D is a quaternary salt surfactant prepared from a 1000 Mn polyisobutylene succinic anhydride and dimethylsulphate.
[5]Surfactant E is a quaternary salt surfactant prepared from a 1000 Mn polyisobutylene succinic anhydride and propylene oxide.

TABLE 2

Dispersion Particle Size and Shear Rate Data

| Example ID | Metal Present | Residence Time (min) | Mean Particle Size (μm) | Particles with size <1 μm | Shear Rate Data | | | |
|---|---|---|---|---|---|---|---|---|
| | | | | | Visc at 10/sec | Visc at 50/sec | Visc at 100/sec | Visc at 200/sec |
| Comp 1 | Ca | 15.64 | 0.312 | 96.7% | 2.00 | 1.09 | 0.90 | 0.76 |
| Comp 2 | Mg | 14.75 | 0.311 | 96.2% | — | — | 2.60 | 2.70 |
| Comp 3 | Mg | 16.08 | 0.278 | 97.6% | 1.54 | 0.91 | 0.76 | 0.67 |
| Ex 1 | Ca | 15.21 | 0.258 | 100% | 0.82 | 0.48 | 0.40 | 0.34 |
| Ex 2 | Ca | 15.12 | 0.260 | 100% | 0.96 | 0.68 | 0.61 | 0.54 |
| Ex 3 | Mg | 14.67 | 0.268 | 98.9% | — | — | 1.00 | 1.00 |
| Ex 4 | Mg | 15.33 | 0.367 | 94.2% | 0.59 | 0.42 | 0.37 | 0.32 |
| Ex 5 | Mg | 15.11 | 0.318 | 96.0% | 2.32 | 1.55 | 1.34 | 1.06 |
| Ex 6 | Mg | 15.48 | 0.320 | 96.3% | 0.90 | 0.72 | 0.67 | 0.62 |

For the calcium containing dispersions, Examples 1 and 2 show an improvement over Comparative Example 1 in mean particle size, particles less than 1 micron, and shear rate properties, after similar residence times. For the magnesium containing dispersions, Comparative Example 2 and Example 3 use the same succinic anhydride surfactant except that in Example 3 the surfactant is further processed to a quaternary salt. The data shows Example 3 has a smaller mean particle size, a higher percent of particles in the dispersion smaller than 1 micron and lower shear rate values than Comparative Example 2. Comparative Example 3 uses a surfactant unrelated to that in Example 3, as described above, but Example 3 still shows a smaller mean particle size and a higher percent of particles in the dispersion smaller than 1 micron compared to the comparative Example. In addition, Example 4, which contains only a quaternary salt surfactant, provides improved shear rate data compared to Comparative Example 3. Examples 5 and 6 contain mixtures of a quaternary salt surfactant and a non-quaternized, commercially available surfactant. None of the Comparative Examples 1-3 contain this surfactant.

As noted above, the results show that the compositions of the present invention may result in dispersions with lower viscosities than dispersions that do not include the quaternary salt surfactant described above. The results also show that the compositions of the present invention may also reduce the mean particle size of the metal particles in the dispersion as well as result in a more uniform particle size distribution, as indicated by the particle size <1 μm data. These improvements in particle size and/or viscosity result in dispersions that have improved material handling characteristics and better storage properties, and so improved performance.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A fuel composition comprising (i) a fuel; and (ii) a dispersion wherein the dispersion comprises:
   (a) an inorganic metal compound;
   (b) a quaternary salt surfactant comprising the condensation product of (1) a hydrocarbyl substituted acylating agent and a compound having an oxygen or nitrogen atom capable of condensing with said acylating agent and said condensation product further having a tertiary amino group; and (2) a quaternizing agent suitable for converting the tertiary amino group of compound (1) to a quaternary nitrogen, wherein the quaternizing agent comprises dialkyl sulfates, hydrocarbyl substituted carbonates, hydrocarbyl epoxides in combination with an acid, or mixtures thereof; and
   (c) an organic medium in which the particles of (a) are uniformly dispersed by physical processes, with (b), forming a dispersion.

2. The composition of claim 1, wherein (a) has a mean average particle size of at least 10 nanometers to no more than 15 micrometers; wherein the dispersion composition has a solids content of greater than 15 wt %.

3. The composition of claim 1 further comprising an additional surfactant comprising hydrocarbyl substituted aryl sulphonic acids, polyolefin-substituted acylating agents, salixarenes, and mixtures thereof 4. The composition of claim 1, wherein the inorganic metal compound is present at 30 wt % to 80 wt % of the dispersion wherein the metal of the inorganic metal compound comprises a monovalent or divalent metal.

5. The composition of claim 1, wherein the metal of the inorganic metal compound comprises lithium, potassium, sodium, copper, zinc, magnesium, calcium, barium, cerium, iron or mixtures thereof.

6. The composition of claim 1, wherein the inorganic metal compound is in the form of particles within the dispersion having a mean average particle size in a range selected from the group consisting of: 1 to 15 micrometers; 10 to 100 nanometers; or mixtures thereof.

7. The composition of claim 1, wherein the inorganic metal compounds is a basic metal compound and the basic portion of the basic metal compound comprises at least one of oxides, hydroxides or carbonates.

8. The composition of claim 1, wherein the hydrocarbyl-substituted acylating agent is polyisobutylene succinic anhydride.

9. The composition of claim 1, wherein the dispersion comprises: (a) 40-60 wt % of an inorganic metal compound; (b) 1-30 wt % of a quaternary salt surfactant; and
   (c) 10-59 wt% of an organic medium in which the metal compound is uniformly dispersed by physical processes.

10. The composition of claim 1, wherein the dispersion further comprises: an oil of lubricating viscosity other than the organic medium; an additional surfactant comprising hydrocarbyl substituted aryl sulphonic acids, polyolefin-substituted acylating agents, salixarenes, or mixtures thereof; and/or other performance additives
   wherein the dispersion is present at 0.5-10 wt %; the oil of lubricating viscosity is present at 70-99.4 wt %; and the other performance additives are present at 0.01-25 wt % of the lubricant composition.

11. The fuel composition of claim 1 wherein the metal compound has a mean average particle size of 10 nanometres to 15 micrometers; and the dispersion has a solids content of 15 to 80 wt %.

12. A method of operating an internal combustion engine comprising supplying to said engine the fuel composition of claim 1.

13. A method of operating an open flame burner comprising supplying to said burner a fuel comprising the composition of claim 1.

* * * * *